United States Patent
Li et al.

(10) Patent No.: US 8,347,301 B2
(45) Date of Patent: Jan. 1, 2013

(54) DEVICE, SYSTEM, AND METHOD OF SCHEDULING TASKS OF A MULTITHREADED APPLICATION

(75) Inventors: Wenlong Li, Beijing (CN); Xiaofeng Tong, Beijing (CN); Aamer Jaleel, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 973 days.

(21) Appl. No.: 12/164,143

(22) Filed: Jun. 30, 2008

(65) Prior Publication Data

US 2009/0328047 A1 Dec. 31, 2009

(51) Int. Cl.
G06F 9/46 (2006.01)
G06F 15/76 (2006.01)

(52) U.S. Cl. ........ 718/104; 718/100; 718/102; 718/103; 718/105; 712/32

(58) Field of Classification Search .................. None
See application file for complete search history.

(56) References Cited

U.S. PATENT DOCUMENTS

| | | | |
|---|---|---|---|
| 6,289,369 B1 * | 9/2001 | Sundaresan | 718/103 |
| 6,820,262 B1 * | 11/2004 | Tellez et al. | 718/106 |
| 7,093,258 B1 * | 8/2006 | Miller et al. | 718/105 |
| 7,159,221 B1 * | 1/2007 | Willen et al. | 718/104 |
| 7,266,540 B2 * | 9/2007 | Chung et al. | 707/999.001 |
| 7,461,376 B2 * | 12/2008 | Geye et al. | 718/100 |
| 7,464,380 B1 * | 12/2008 | Hempel | 718/102 |
| 7,490,220 B2 * | 2/2009 | Balasubramanian et al. | 712/32 |
| 7,996,346 B2 * | 8/2011 | Bell et al. | 706/25 |
| 2005/0210472 A1 * | 9/2005 | Accapadi et al. | 718/105 |
| 2007/0226696 A1 * | 9/2007 | Radhakrishnan et al. | 717/127 |

OTHER PUBLICATIONS

Intel® ; Developing Multithreaded Applications: A Platform Consistent Approach V. 2.0, Feb. 2005.*

* cited by examiner

*Primary Examiner* — Meng An
*Assistant Examiner* — Bing Zhao
(74) *Attorney, Agent, or Firm* — Shichrur & Co.

(57) ABSTRACT

Device, system, and method of executing multithreaded applications. Some embodiments include a task scheduler to receive application information related to one or more parameters of at least one multithreaded application to be executed by a multi-core processor including a plurality of cores and, based on the application information and based on architecture information related to an arrangement of the plurality of cores, to assign one or more tasks of the multithreaded application to one or more cores of the plurality of cores. Other embodiments are described and claimed.

18 Claims, 5 Drawing Sheets

DEVICE, SYSTEM, AND METHOD OF SCHEDULING TASKS OF A MULTITHREADED APPLICATION

BACKGROUND

Multi-core processors (CMPs) may include a plurality of cores capable of running multithreaded applications.

In some multi-core processors, the cores may be arranged in one or more core clusters including two or more cores sharing a cache, for example, a last-level cache (LLC) and/or a medium-level cache (MLC).

A task scheduler may be implemented, e.g., as part of an Operating System (OS), to schedule tasks of one or more multithreaded applications to one or more of the cores via one or more respective core threads.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Figure 1:
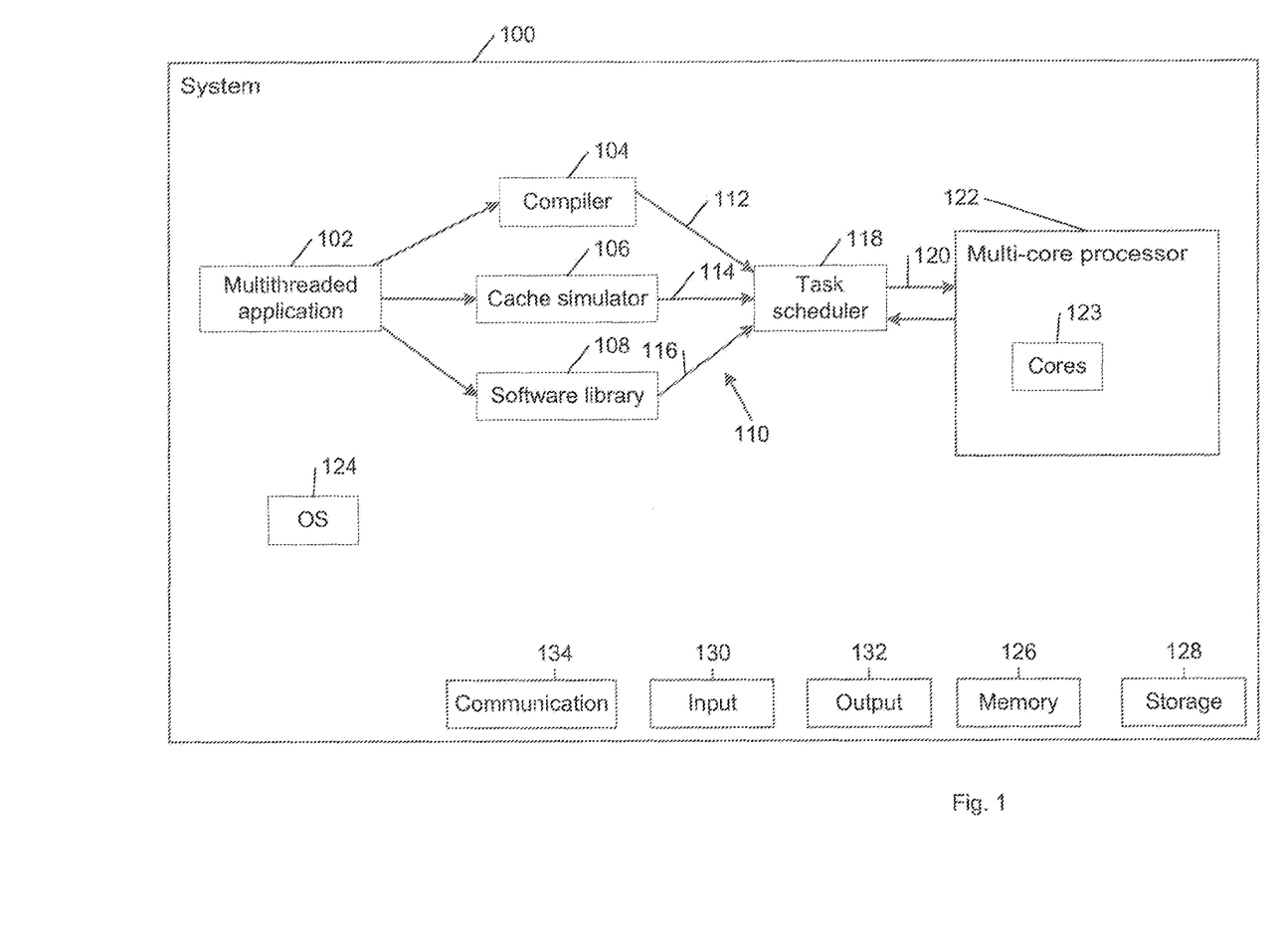
FIG. 1 is a schematic block diagram illustration of a system in accordance with some demonstrative embodiments.

FIG. 1 schematically illustrates a block diagram of a system 100 including a multi-core processor 122, which includes a plurality of cores 123, in accordance with some demonstrative embodiments.

In some embodiments, system 100 may include a task scheduler 118 to receive application information related to one or more parameters of at least one multithreaded application 102 to be executed by multi-core processor 122. Task scheduler 118 may assign one or more tasks of application 102 to one or more of cores 123, based on the application information and based on architecture information related to an arrangement of cores 123, e.g., as described in detail below.

In some embodiments, the architecture information may include, for example, information related to an arrangement of cores 123 in one or more core clusters sharing one or more respective caches, e.g., a last-level cache (LLC) or a mid-level cache (MLC), as described below.

Figure 2:
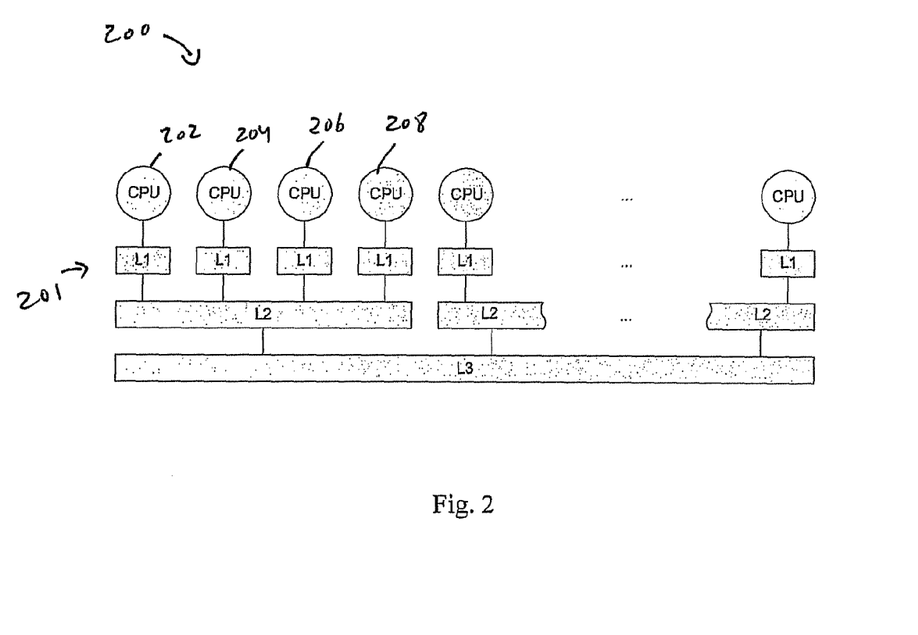
FIG. 2 is a schematic illustration of a clustered multi-core architecture, in accordance with some demonstrative embodiments.

Reference is also made to FIG. 2, which schematically illustrates a clustered architecture 200, in accordance with some demonstrative. In one embodiment, architecture 200 may be implemented by multi-core processor 122 (FIG. 1). As shown in FIG. 2, architecture 200 may include a plurality of cores arranged in one or more core clusters. For example, architecture 200 may include one or more core cluster 201 of four cores 202, 204, 206 and 208 sharing a MLC, denoted L2, via four respective private caches, denoted L1. In one embodiment, architecture 200 may include sixteen cores arranged in four clusters 201. The cores of architecture 200 may all share a LLC, denoted L3. In other embodiments, any other suitable clustered architecture may be implemented. One or more hardware prefetchers may be associated with a shared cache. For example, the L2 cache may be shared by four cores, and may have two hardware prefetchers.

Referring back to FIG. 1, in some embodiments the application information received by task scheduler 118 may include at least one of a thread coupling degree of application 102, a bandwidth utilization rate of application 102, and a speedup profile of application 102, e.g., as described below.

In some embodiments, task scheduler 118 may schedule the tasks of application 102 based on the thread coupling degree of application 102, for example, to effectively and/or efficiently utilize an architecture, e.g., clustered architecture 200 (FIG. 2), of multi-core processor 122 in order to achieve, for example, fast communication and/or synchronization among two or more core threads associated with two or more of cores 123.

In some embodiments, the thread coupling degree of multithreaded application 102 may be related to a data sharing behavior of the tasks of application 102. The data sharing behavior may be determined, for example, based on at least a distribution of cache space between threads of application 102; and/or a distribution of memory accesses to shared and to private cache lines, which may represent, footprints of shared accesses and private accesses.

In one example, application 102 may include an application of a first type, e.g., a 4-threaded PageRank application or a Support Vector Machine-Recursive Feature Elimination (SVM-RFE) application, having a relatively low level, e.g., a level of about 2%, of LLC cache data shared among threads; and/or having a relatively high level, e.g., a level of 90%, of private memory accesses to private data.

In another example, application 102 may include an application of a second type, e.g., an Interior Point System (IPS) application, having a relatively high level, e.g., a level of at least 70%, of LLC cache data shared among threads; and/or having a relatively high level, e.g., a level of at least 70%, of shared memory accesses to shared data.

In some embodiments, application 102 may be categorized according to the footprints of shared accesses and private accesses. For example, application 102 may be categorized as having a relatively high degree of thread coupling ("tight thread coupling") if the footprint of shared memory accesses is greater than a predefined threshold, e.g., 50%. Accordingly, application 102 may be categorized as having a relatively low degree of thread coupling ("loose thread coupling"), e.g., if application 102 includes an application of the first type; or as tight thread coupling, e.g., if application 102 includes an application of the second type.

In some embodiments, the thread coupling degree of application 102 may be determined offline, e.g., prior to executing application 102 by multi-core processor 122.

In some embodiments, task scheduler 118 may assign the tasks of application 102 to core threads of two or more cores belonging to a common core cluster, e.g., two or more cores of cores of the same cluster 201 (FIG. 2), if, for example, application 102 is tight thread coupling, e.g., as described below with reference to FIG. 4. Assigning the tasks to cores of a common core cluster may result, for example, in fast communication and/or synchronization for high parallel performance.

In some embodiments, task scheduler 118 may receive application information 114 indicative of the thread coupling degree of application 102 from a cache simulator 106. Cache simulator 106 may include any suitable module capable of modeling the architecture of multi-core processor 122, calculating the data sharing behavior, and/or determining the thread coupling degree of application 102.

In some embodiments, task scheduler 118 may schedule the tasks of application 102 based on the bandwidth utilization rate of application 102. In one embodiment, at least one set of two or more cores of cores 123 may have at least one shared interconnect, e.g., a front-side bus. The utilization of the shared interconnect may affect a performance of multi-core processor 122.

In one example, application 102 may include an application, e.g., the PageRank application, having the following bandwidth utilization rate as a function of the number of utilized threads:

TABLE 1

| | Thread Count | | | | |
|---|---|---|---|---|---|
| | 1 | 2 | 4 | 8 | 16 |
| Bandwidth Utilization Rate | 10.7% | 19.7% | 32.5% | 58.9% | 61.8% |

In some embodiments, the bandwidth utilization rate of application 102 may be determined offline, e.g., prior to executing application 102 by multi-core processor 122. The bandwidth utilization rate of application 102 may be determined, for example, using any suitable analysis tool, e.g., the Vtune™ Analyzer.

In some embodiments, multi-core processor 123 may include a clustered architecture, e.g., architecture 200 (FIG. 2), having a plurality of interconnects associated with a plurality of core clusters. In one embodiment, task scheduler 118 may assign the tasks of application 102 to core threads of two or more cores belonging to different core clusters if, for example, the bandwidth utilization rate of application 102 corresponding to a number of utilized threads is greater than a predefined threshold, e.g., 20%. Task scheduler 118 may assign the tasks to threads of two or more cores belonging to a common core cluster if, for example, the bandwidth utilization rate is lesser than the predefined threshold, e.g., as described below with reference to FIG. 4. In another embodiment, task scheduler 118 may assign the tasks to core threads of two or more cores belonging to different core clusters, if the bandwidth utilization rate is greater than the predefined threshold and application 102 is loose thread-coupling, e.g., as described below with reference to FIG. 4.

According to Amdahl's law, the performance of a multithreaded application may not scale linearly with the number of threads due to parallelization problems such as, for example, the serial region, parallelization overhead, synchronization, load imbalance, and the like. In addition, competition on shared resources, such as the interconnect bandwidth, may also affect the degree of parallel speedup.

In some embodiments, the speedup profile corresponding to application 102 may be determined, for example, by executing application 102 using different numbers of threads. In some embodiments, the speedup profile corresponding to application 102 may be determined offline, e.g., prior to executing application 102 by multi-core processor 122. The speedup profile may be used to determine a point ("the speedup knee") at which an increase in the number of cores with result in a drop or relatively small increase in the speedup.

Figure 3:
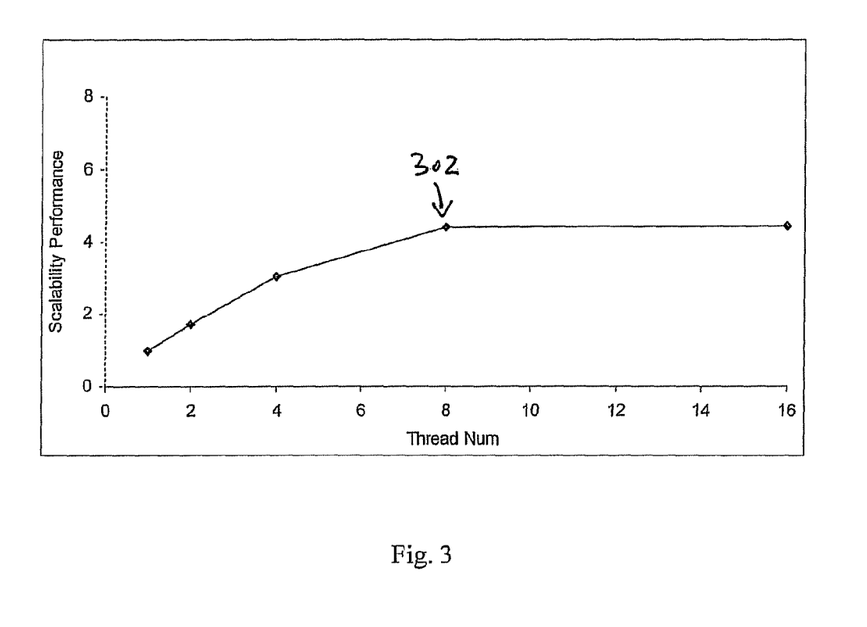
FIG. 3 is an illustration of a graph depicting the speedup profile of a PageRank application, in accordance with some demonstrative embodiments.

FIG. 3 illustrates a graph depicting scaleability performance versus the number of threads for the PageRank application. As shown in FIG. 3, scaling the number of threads from four to eight may provide a first performance increase, e.g., of about 31%, for the PageRank application. Scaling the number of threads from eight to sixteen may provide a second performance increase, e.g., of less than 2%. Therefore, a speedup knee 302 of the PageRank application may be determined to correspond to eight cores. As a result, substantially the same performance may be achieved when executing the PageRank application with eight cores or with sixteen cores.

In one example, the following speedup knees may be determined for the PageRank, SVM-RFE and IPS applications:

TABLE 2

| Application workload | PageRank | SVM-RFE | IPS |
|---|---|---|---|
| Speedup knee point value | 8 | 6 | 4 |

Referring back to FIG. 1, in some embodiments task scheduler 118 may determine a number of one or more core threads to which to assign the tasks of application 102 based on the speedup profile.

In some embodiments, task scheduler 118 may determine the number of core threads to be the lesser of a number of available cores and a number of cores corresponding to the speedup knee point of the speedup profile, e.g., as described below with reference to FIG. 4. For example, if multi-core processor 122 includes sixteen cores 123, of which twelve are available, and the speedup knee point of application 102 is eight, then task scheduler 118 may assign the tasks of application 102 to eight cores 123.

In some embodiments, selection of a parallel degree or thread number may be important for executing application 102 by multi-core processor 122, for example, in terms of performance and/or energy efficiency. For example, if multi-core processor 122 includes sixteen cores 123, then application 102 may be executed using only eight of cores 123, while switching one or more the remaining eight cores into a low-power mode for energy savings, and/or using one or more the remaining eight cores to execute other ready workload, thereby to improve throughput.

In some embodiments, task scheduler 118 may receive application information 116 indicative of the speedup profile, the speedup knee point, and/or the bandwidth utilization rate of application 102 of application 102 from any suitable software library 108.

In some embodiments, task scheduler 118 may be capable of determining, and/or may be provided with, dynamically updated application information indicating up-to-date data sharing, bandwidth demand, and/or scalability performance of application 102. Task scheduler 118 may be capable of assigning the tasks of application 102 to cores 123 based on the updated application information.

Figure 4:
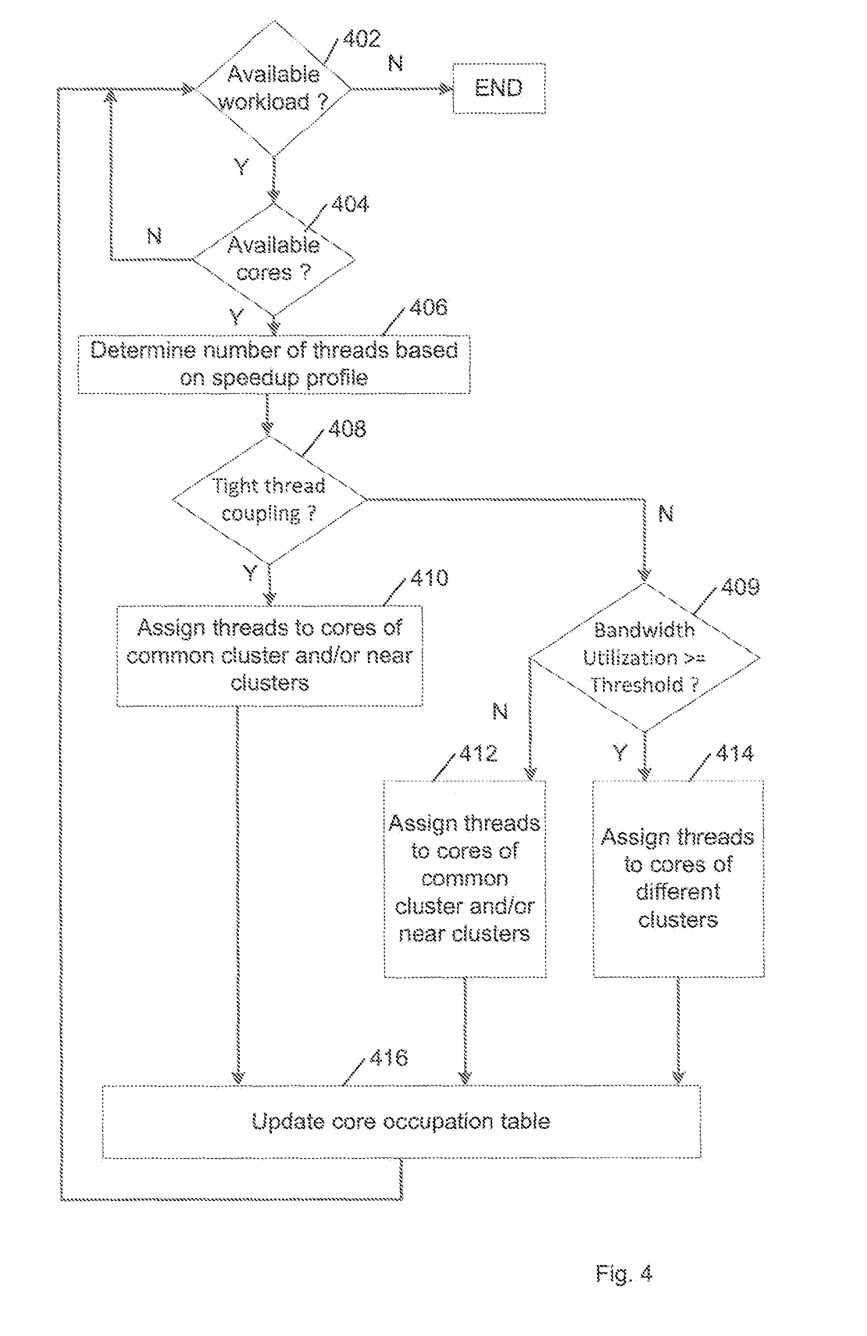
FIG. 4 is a schematic flow-chart illustration of a method of executing one or more multithreaded applications by a multi-core processor, in accordance with some demonstrative embodiments.

Reference is made to FIG. 4, which schematically illustrates a method of executing a multithreaded application by a multi-core processor including a plurality of cores, in accordance with some demonstrative embodiments. In some embodiments, one or more operations of the method of FIG. 4 may be implemented by a task scheduler, e.g., task scheduler 118 (FIG. 1), to schedule tasks of a multithreaded application, e.g., application 102 (FIG. 1), to a multi-core processor, e.g., processor 122 (FIG. 1).

As indicated at block 402, the method may include determining whether or not there is at least one application workload available for execution.

As indicated at block 404, the method may include determining whether or not there are one or more available cores, e.g., if an application workload is detected to be available for execution. For example, the method may include determining one or more available cores by checking a core occupation table.

As indicated at block 406, the method may include determining a number of one or more core threads to which to assign tasks of the available application workload based on a speedup profile of the application workload. In one embodiment, the method may include determining the number of the core threads to be the lesser of the number of available cores and a number of cores corresponding to a speedup knee point of the speedup profile.

In some embodiments, the method may include assigning the tasks according to a thread coupling degree and/or a bandwidth utilization rate of the application workload, e.g., as described below.

As indicated at block 408, the method may include determining whether or not the application workload is tight thread coupling.

As indicated at block 410, the method may include assigning the tasks to core threads of two or more cores belonging to a common core cluster, e.g. if the application is tight thread coupling. The tasks may be assigned to cores of one or more additional clusters, which may be located relatively close to the common cluster, e.g., if the number of threads is greater than the number of available cores in the common core cluster.

As indicated at block 409, the method may include determining whether or not the bandwidth utilization rate is equal to or greater than a predefined threshold, e.g., if the application is loose thread coupling.

As indicated at block 412, the method may include assigning the tasks to threads of two or more cores belonging to a common core cluster, e.g., if the bandwidth utilization rate is lesser than the predefined threshold. The tasks may be assigned to cores of one or more additional clusters, which may be located relatively close to the common cluster, e.g., if the number of threads is greater than the number of available cores in the common core cluster.

As indicated at block 414, the method may include assigning the tasks to core threads of two or more cores belonging to different core clusters, e.g., if the bandwidth utilization rate is equal to or greater than the predefined threshold.

As indicated at block 416, the method may include updating the core occupation table based on the assignment of the tasks to the cores. The method may also include resetting an entry in the table corresponding to the assigned cores, e.g., upon completing the execution of the application tasks.

In some embodiments, one or more operations of the method of FIG. 4 may be implemented to select a parallel degree, e.g., in order to efficiently utilize the multi-core processor, for example, in terms of performance and/or energy savings; reserve data locality between threads via shared LLC for better memory subsystem performance; and/or utilize the dedicated interconnect resources to provide better scaling performance.

Following are descriptions of two experimental implementations of results of executing multithreaded applications by a multi-core processor, while implementing the task scheduling in accordance with some embodiments.

Figure 5:
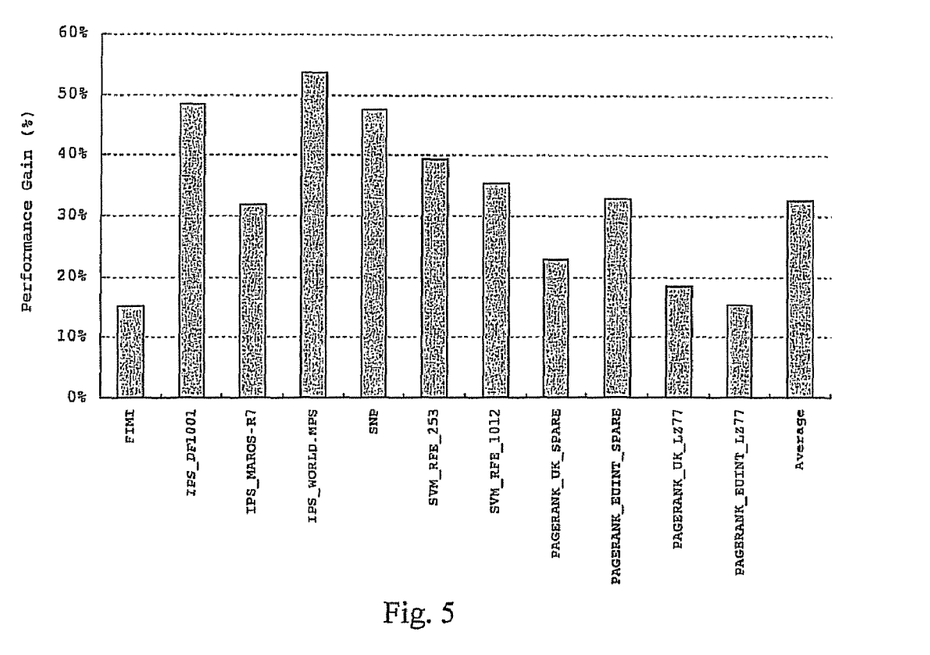
FIG. 5 is an illustration of a graph depicting performance gains of task scheduling according to some embodiments, compared to a default Operating System (OS) scheduling algorithm for eleven different application workloads.

In a first implementation, a single multithreaded application workload is provided for scheduling. FIG. 5 illustrates the performance gains of the task scheduling according to some embodiments, as compared to a default Operating System (OS) scheduling algorithm for eleven different application workloads. As shown in FIG. 5, an average performance gain of 33% may be achieved. In one example, threads of the IPS and Frequent ItemSet Mining (FIMI) workloads may be assigned to cores of a common cluster sharing a LLC, e.g., as described above, since, for example, the IPS and FIMI workloads may be characterized by significant data sharing footprints and insignificant bandwidth demand. As a result, the shared LLC may be fully utilized, e.g., to keep data locality, and thereby achieve a good cache performance, which in turn may result in a gain in performance. In another example, Structure Learning (SNP), SVM_RFE, and PAGERANK workloads may be characterized by high contention on interconnect bandwidth and low data sharing. Accordingly, threads of these workloads may be allocated to cores of different clusters, e.g., in order to utilize the aggregated bandwidth, and increase the parallel performance. By selecting an appropriate parallel degree to accelerate each multithreaded workload, e.g., according to the speedup knee point described above, some cores may be switched to a low-power mode for energy saving. For example, when running the PageRank workload with a processor including sixteen cores, there may be eight unused cores unused; and when running the IPS workload, there may be twelve unused cores, e.g., as described above with reference to Table 2. Switching these unused cores into low power mode may significantly reduce the power consumption while maintaining performance.

Figure 6:
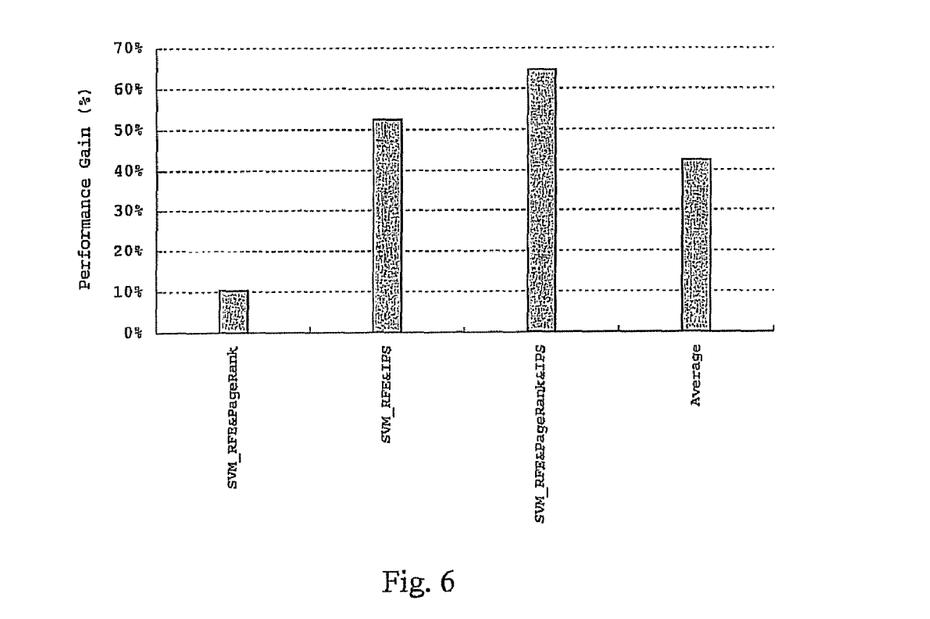
FIG. 6 is an illustration of a graph depicting performance gains of task scheduling according to some embodiments, compared to a default OS scheduling algorithm for simultaneously running application workloads.

In a second implementation, pluralities of application workloads are simultaneously provided for scheduling. The throughput metric may be used to measure performance. FIG. 6 illustrates the performance gains of the task scheduling according to some embodiments, as compared to a default Operating System (OS) scheduling algorithm for running the SVM_RFE and PageRank workloads simultaneously ("SVM-RFE&PageRank"), for running the SVM_RFE and IPS workloads simultaneously ("SVM-RFE&IPS"), and for running the SVM_RFE, PageRank and IPS workloads simultaneously ("SVM-RFE&PageRank&IPS"), respectively. As shown in FIG. 6, an average performance gain of 42% may be achieved.

Referring back to FIG. 1, in some embodiments the application information received by task scheduler 118 may include data locality information identifying at least one local data access pattern corresponding to the tasks of application 102, respectively, e.g., as described below.

In some embodiments, parallelizing an application, e.g., application 102, into threads, and executing the threads on different cores of a multi-core processor, e.g., processor 122, may result in a data locality problem, which may be caused by the spreading of memory accesses across multiple caches. For example, sequential program execution of a certain code may result in the following memory accesses:

| OP |
|---|
| ... |
| Read (A) |
| ... |
| Read (B) |
| ... |
| Read (A + 1) |
| ... |
| Read (B + 1) |
| ... |
| Read (A + 2) |
| ... |
| Read (B + 2) |
| ... |
| Read (A + 3) |
| ... |
| Read (B + 3) |
| ... |

In the sequential program execution, the memory read operations on address A and B may exhibit a regular access pattern, e.g., since the address difference between adjacent accesses to addresses A or B is one cache line size. As a result, the sequential execution may be "friendly" for a hardware prefetcher, which may capture the access pattern, and predict near-future memory accesses accurately. However, parallel execution of the same code may result in the following memory accesses, e.g., via two threads:

| Thread 1 | Thread 2 |
|---|---|
| OP | OP |
| ... | ... |
| Read (A) | Read (B) |
| ... | ... |
| Read (B + 1) | Read (A + 1) |
| ... | ... |
| Read (A + 2) | Read (B + 2) |
| ... | ... |
| Read (A + 3) | Read (B + 3) |
| ... | ... |

The spatial data locality exhibited in the sequential program execution may be lost in the multithreaded parallel implementation, if the tasks or memory accesses are not smartly scheduled. In the parallel execution, the memory accesses in each thread follow an irregular memory access pattern, which may be "unfriendly" for the hardware prefetcher.

The latency of memory access may generally be more than ten times longer than the on-chip cache. Therefore, utilizing the hardware prefetcher to recognize regular memory access patterns, and to prefetch data into cache may result in an increase in the cache hit rate, and a reduction in the average memory access time, thereby increasing overall performance.

In some embodiments, it may be shown that utilizing the hardware prefetcher on a Core 2 Quad-Core processor may improve the performance of single-threaded media mining workloads by more than 35%, while an improvement of less than 15% may be achieved for parallel-thread media mining workloads. This difference in the achieved improvement may be related to the disruption of the spatial data locality. A breakdown of memory accesses may show that the memory accesses with regular pattern account for about 95% in the single-threaded case, compared to only about 62% in a four-threaded case.

In some embodiments, task scheduler 118 may be capable of maintaining the spatial data locality when scheduling the tasks of application 102 to multiple threads to be executed by cores 123, e.g., as described below.

In some embodiments, data locality information corresponding to application 102 may be detected and/or annotated e.g., prior to execution of application 102, e.g., as described below.

In one embodiment, the data locality information may be provided via programmer annotations, which may be added to the code, for example, in the form of "pragma" compiler directives. In one example example, the following while-loop code may include the directive annotations "pragma task regular pattern" to identify spatial data locality:

```
void test( )
{
#pragma omp taskq
    while ( )
    {
        #pragma task regular_pattern
        process(A[i]);
        #pragma task regular_pattern
        process(B[i]);
        #pragma task regular_pattern
        process(C[i]);
        #pragma task regular_pattern
        process(D[i]);
    }
}
```

In the above code, instances of the tasks from different iterations may demonstrate good spatial data locality. For example, the instances of the first task from iterations 0, 1, and 2 require memory access to elements A[i], A[i+1], and A[i+2], respectively, thereby forming a regular access pattern. In some embodiments, task scheduler 118 may be informed of this regular access pattern, e.g., using the annotations. Based on the data locality information, task scheduler 118 may allocate these three tasks to be executed by a common core or of cores 123 or a common core cluster. As a result, a hardware prefetcher of the common core or core cluster may exploit the regular access pattern to accurately fetch the required data into cache in advance, for example, to avoid cache miss and/or long-latency memory access.

In another embodiment, the data locality information may be received as part of application information 112 received from a compiler 104, which may be capable of analyzing the code of application 102 to determine the data locality information. For example, compiler 104 may be capable of performing suitable sophisticated data flow analysis, to detect regular memory access patterns in the code of application 102. Compiler 104 may then mark tasks having spatial data locality on their memory elements. In one example, compiler 104 may analyze the while-loop code described above, to detect and annotate the fours tasks have good spatial data locality on memory data arrays A, B, C, and D, respectively. The annotation may include, for example, an annotation {taskID, data locality parameter}, wherein the data locality parameter may have a first predefined value, e.g., "1" to identify good data locality, or a second value, e.g., "0" to identify poor data locality. For example, compiler 104 may provide task scheduler 118 with the following annotation related to the while-loop: {task0, 1} {task1, 1} {task2, 1} {task3, 1}. Any other suitable notation may be implemented.

In one embodiment, task scheduler 118 may schedule tasks of application 102 according to a centralized scheduling scheme. For example, a global list of ready tasks may be maintained, wherein a task is encoded with a core identifier (ID) of a core intended to execute the task. When a core of cores 123 is idle, the core may scan the task list to find a task encoded with ID of the core. If the lookup succeeds, then the core fetches the task from the list and executes it. If the lookup fails after scanning all tasks in the list, the core may select a ready task and runs it, e.g., to achieve a balanced workload. If multi-core processor 122 includes a clustered architecture, e.g., architecture 200 (FIG. 2), then according to this embodiment, task scheduler 118 may encode two or more tasks resulting in a predefined data access pattern with a common core ID, or a cluster ID, for example, if multi-core processor 122 includes a clustered architecture, as described above. The cluster ID may be determined by task scheduler 118, for example, by dividing the core ID by the number of clusters in multi-core processor 122.

In another embodiment, task scheduler 118 may schedule tasks of application 102 according to a distributed scheduling scheme. For example, cores 123 may be associated with a plurality of task queue buffers. At runtime, task scheduler 118 may enqueue a ready task into a queue associated with a core intended to execute the task. When a core is free, it may dequeue one ready task from the queue. When the queue is empty, the core may "steal" a ready task from another queue, e.g., based on a latency consideration. According to this embodiment, task scheduler 118 may schedule two or more tasks resulting in a predefined data access pattern by queuing the two or more tasks in a common core queue buffer or a cluster queue buffer, for example, if multi-core processor 122 includes a clustered architecture, as described above.

In some embodiments, task scheduler 118 may employ the architecture information corresponding to the arrangement of cores 123, e.g., including the core IDS and/or cluster IDs corresponding to cores 123, to schedule the tasks of application 102 in accordance with the data locality information, e.g., in order to reserve spatial data locality when executing the tasks. Scheduling the tasks with good spatial locality on cores sharing the LLC, may allow the prefetchers on the shared LLC to capture a regular access pattern corresponding to the tasks, and to predict data for other cores on the same cluster.

Figure 7A:
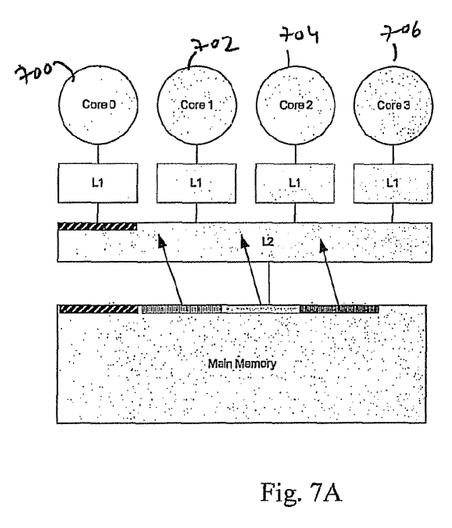
FIGS. 7A and 7B are schematic illustrations of a prefetching operation performed by a core cluster, in accordance with some embodiments.
Figure 7B:
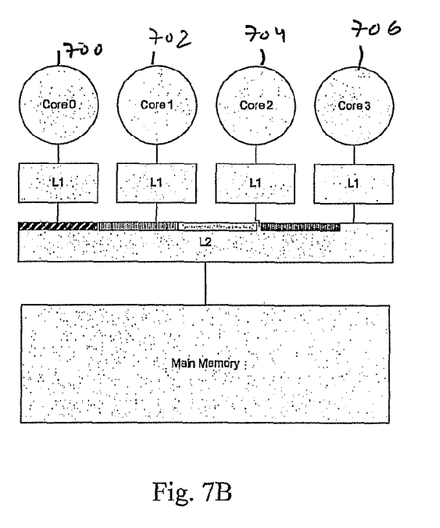

FIGS. 7A and 7B schematically illustrate a prefetching operation performed within a core cluster, in accordance with some embodiments. As shown in FIG. 7A, a hardware prefetcher associated with the shared L2 cache may detect the regular memory access pattern corresponding to a four tasks, which were scheduled by task scheduler 118 according to the data locality information. After fetching a first cache block intended for a first core 700, the hardware prefetcher may prefetch three following cache blocks into the L2 cache, such that the three cache blocks may be available for three other cores 702, 204 and 706, respectively, in the shared L2, as shown in FIG. 7B.

In one experimental embodiment, a Core 2 Quad-Core processor was implemented. In this implementation, each core utilizes a 32 Kilobyte (KB) private L1 data cache, and each two cores share a 4 MB unified L2 cache. In this implementation, the multi-core processor includes a plurality of hardware prefetchers associated with the L1 and L2 caches, and application 102 includes media mining workloads, parallelized in a fine-grained way, where each frame is portioned into blocks, and computations on one block represent one task. Both the distributed and centralized scheduling schemes were implemented. Experimental results show that implementing the task scheduling according to the data locality information, e.g., as described above, may result in a performance gain of about 15% for two cores, and a performance gain of about 25% for four cores, e.g., compared to a default OS scheduling algorithm. This performance gain may result, for example, from scheduling the tasks with good spatial locality to one core or to two or more cores of a common cluster, so that the regular memory access pattern is not disrupted, spatial data locality is reserved during the parallel execution of the tasks using multiple threads. This, "prefetcher friendly" scheduling may allow the hardware prefetcher to effectively prefetch required data into the cache. As a result, long latency memory access may be reduced.

In some embodiments, system 100 may include or may be part of a computing system including a memory unit 126, a storage unit 128, an input unit 130, an output unit 132, a communication unit 134 and/or any other suitable component. Input unit 130 includes, for example, a keyboard, a keypad, a mouse, a touch-pad, a stylus, a microphone, or other suitable pointing device or input device. Output unit 132 include, for example, a cathode ray tube (CRT) monitor or display unit, a liquid crystal display (LCD) monitor or display unit, a screen, a monitor, a speaker, or other suitable display unit or output device. Memory unit 126 includes, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. Storage unit 128 includes, for example, a hard disk drive, a floppy disk drive, a compact disk (CD) drive, a CD-ROM drive, a digital versatile disk (DVD) drive, or other suitable removable or non-removable storage units. Communication unit 116 includes, for example, a wired or wireless network interface card (NIC), a wired or wireless modem, a wired or wireless receiver and/or transmitter, a wired or wireless transmitter-receiver and/or transceiver, a radio frequency (RF) communication unit or transceiver, or other units able to transmit and/or receive signals, blocks, frames, transmission streams, packets, messages and/or data.

Memory unit 126 and/or storage unit 128 may, for example, store data processed by system 100. In some embodiments, task scheduler 118 and/or software library 108 may be implemented as part of an OS 124, which may result from executing instructions stored by memory unit 126 and/or storage unit 128.

In some embodiments, task scheduler may be implemented by executing instructions stored by memory unit 126 and/or storage unit 128. In one embodiment, one or more operations of task scheduler 118 may be implemented as part of any suitable software library, e.g., software library 108. In another embodiment, software library 108 and task scheduler 118 may be implemented as separate and/or different elements of system 100.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and/or an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A computing device comprising:
  a multi-core processor including a plurality of cores arranged in a plurality of core clusters; and
  a task scheduler to receive application information relating to at least one multithreaded application and to assign tasks of said multithreaded application to a plurality of threads to be executed by said multi-core processor, the application information including a speedup knee point of a speedup profile curve of said multithreaded application, a thread coupling degree and a bandwidth utilization rate, the speedup knee point including a point of said speedup profile curve at which an increase in a number of said threads will not result in substantial increase in a scalability performance, the thread coupling degree representing a degree of sharing one or more data resources by said threads, and the bandwidth utilization rate representing a rate of utilization of a shared hardware interconnect according to the number of said threads, wherein said task scheduler is to determine the number of said threads based on the speedup knee-point, wherein, said task scheduler is to assign said tasks to threads of two or more cores belonging to a common core cluster, if said thread coupling degree is greater than a predefined thread coupling threshold, and wherein said task scheduler is to assign said tasks to threads of two or more cores belonging to different core clusters, if said thread coupling degree is not greater than said predefined thread coupling threshold and said bandwidth utilization rate is greater than a predefined bandwidth utilization threshold.

2. The computing device of claim 1, wherein said task scheduler is to assign said tasks to threads of two or more cores belonging to the common core cluster, if said bandwidth utilization rate is not greater than said predefined bandwidth utilization threshold.

3. The computing device of claim 1, wherein said task scheduler is to update a core occupation table based on the assignment of said threads.

4. The computing device of claim 1, wherein said task scheduler is to determine the number of said threads to be the lesser of a number of available cores of said plurality of cores and a number of cores corresponding to the speedup knee point of said speedup profile.

5. The computing device of claim 1, wherein said tasks include tasks of an available workload of said multithreaded application.

6. The computing device of claim 1, wherein said application information comprises data locality information identifying at least one data access pattern corresponding to said tasks and wherein said task scheduler is to assign said tasks based on the data locality information.

7. The computing device of claim 6, wherein said scheduler is to schedule said tasks according to a centralized scheduling scheme, by encoding two or more tasks of said tasks, which results in a predefined data access pattern, with a common core identifier or core-cluster identifier.

8. The computing device of claim 6, wherein said scheduler is to schedule said tasks according to a distributed scheduling scheme by queuing, in a common core or core-cluster queue buffer, two or more tasks of said tasks, which result in a predefined data access pattern.

9. The computing device of claim 6, wherein said data locality information comprises one or more program annotations associated with said tasks.

10. A computer-based method of assigning tasks of a multithreaded application to a plurality of threads to be executed by a multi-core processor including a plurality of cores arranged in a plurality of core clusters, the method including:
receiving by a computing device application information relating to said multithreaded application, the application information including a speedup knee point of a speedup profile curve of said multithreaded application, a thread coupling degree and a bandwidth utilization rate, the speedup knee point including a point of said speedup profile curve at which an increase in a number of said threads will not result in substantial increase in a scalability performance, the thread coupling degree representing a degree of sharing one or more data resources by said threads, and the bandwidth utilization rate representing a rate of utilization of a shared hardware interconnect according to the number of said threads
determining the number of said threads based on the speedup knee-point;
assigning said tasks to threads of two or more cores belonging to a common core cluster, if said thread coupling degree is greater than a predefined thread coupling threshold; and
assigning said tasks to threads of two or more cores belonging to different core clusters, if said thread coupling degree is not greater than said predefined thread coupling threshold and said bandwidth utilization rate is greater than a predefined bandwidth utilization threshold.

11. The method of claim 10 comprising assigning said tasks to threads of two or more cores belonging to the same core cluster, if said bandwidth utilization rate is not greater than the predefined bandwidth utilization threshold.

12. The method of claim 10 comprising assigning said tasks based on data locality information identifying at least one data access pattern corresponding to said tasks.

13. The method of claim 10, wherein determining the number of said threads comprises determining the number of said threads to be the lesser of a number of available cores of said plurality of cores and a number of cores corresponding to the speedup knee point of said speedup profile.

14. The method of claim 10 comprising scheduling said tasks according to a centralized scheduling scheme, by encoding with a common core identifier or core-cluster identifier two or more tasks, which result in a predefined data access pattern.

15. The method of claim 10 comprising scheduling said tasks according to a distributed scheduling scheme by queuing in a common core or core-cluster queue buffer two or more tasks, which result in a predefined data access pattern.

16. A computer program product comprising a non-transitory computer-useable medium including a computer-readable program, wherein the computer-readable program when executed on a computer causes the computer to:
receiving application information relating to at least one multithreaded application to be executed by a multi-core processor including a plurality of cores arranged in a plurality of core clusters; and
assigning tasks of said multithreaded application to a plurality of threads,
wherein the application information includes a speedup knee point of a speedup profile curve of said multithreaded application, a thread coupling degree and a bandwidth utilization rate, the speedup knee point including a point of said speedup profile curve at which an increase in a number of said threads will not result in substantial increase in a scalability performance, the thread coupling degree representing a degree of sharing one or more data resources by said threads, and the bandwidth utilization rate representing a rate of utilization of a shared hardware interconnect according to the number of said threads, and wherein the assigning comprises determining the number of said threads based on the speedup knee-point; assigning said tasks to threads of two or more cores belonging to a common core cluster, if said thread coupling degree is greater than a predefined thread coupling threshold; and assigning said tasks to threads of two or more cores belonging to different core clusters, if said thread coupling degree is not greater than said predefined thread coupling threshold and said bandwidth utilization rate is greater than a predefined bandwidth utilization threshold.

17. The computer program product of claim 16, wherein said assigning comprises assigning said tasks to threads of two or more cores belonging to the same core cluster, if said bandwidth utilization rate is not greater than the predefined bandwidth utilization threshold.

18. The computer program product of claim 16, wherein said application information comprises data locality information identifying at least one data access pattern corresponding to said tasks and wherein said assigning comprises assigning said tasks based on the data locality information.

* * * * *

UNITED STATES PATENT AND TRADEMARK OFFICE
CERTIFICATE OF CORRECTION

PATENT NO.        : 8,347,301 B2
APPLICATION NO.   : 12/164143
DATED             : January 1, 2013
INVENTOR(S)       : Wenlong Li et al.

Page 1 of 1

It is certified that error appears in the above-identified patent and that said Letters Patent is hereby corrected as shown below:

In the Claims:

In column 13, line 55, in claim 10, after "threads" insert -- ; --.

Signed and Sealed this
Twenty-first Day of May, 2013

Teresa Stanek Rea
*Acting Director of the United States Patent and Trademark Office*